W. S. KRAUSE.
DEMOUNTABLE RIM.
APPLICATION FILED JAN. 3, 1920.
1,342,118.
Patented June 1, 1920.
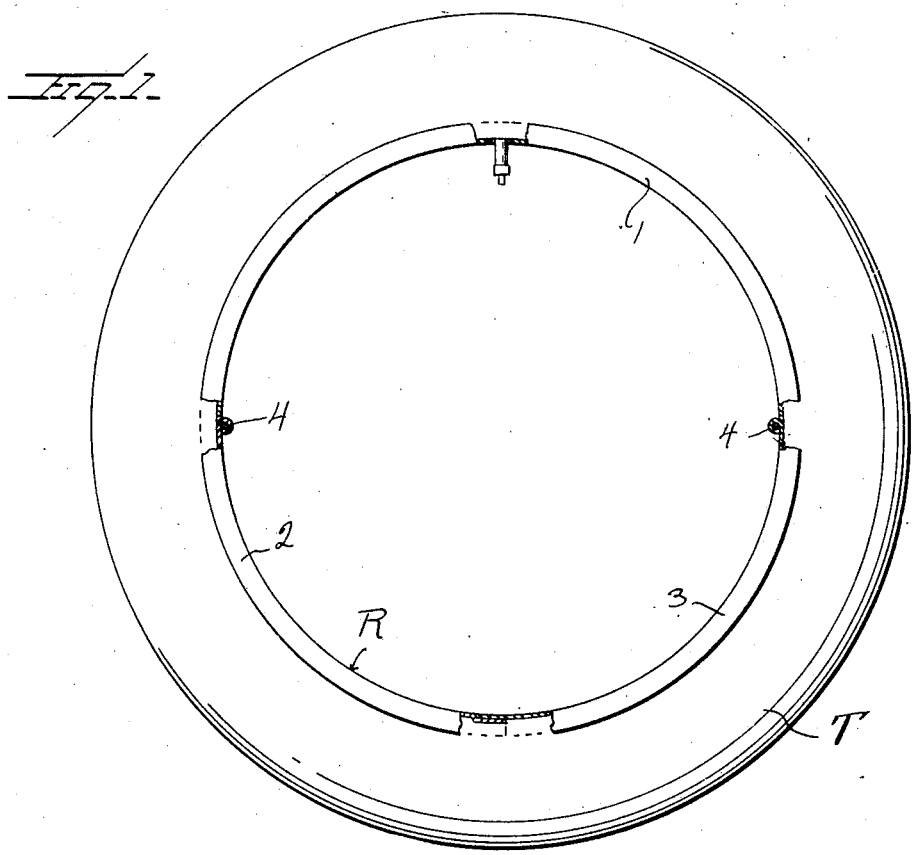
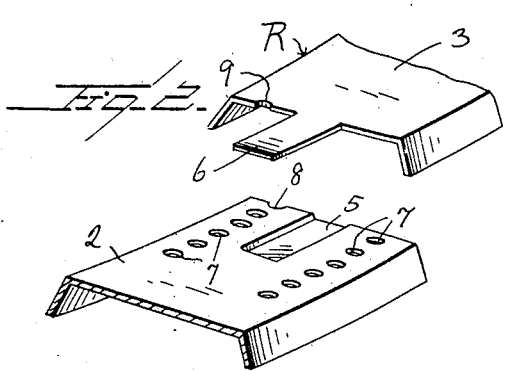
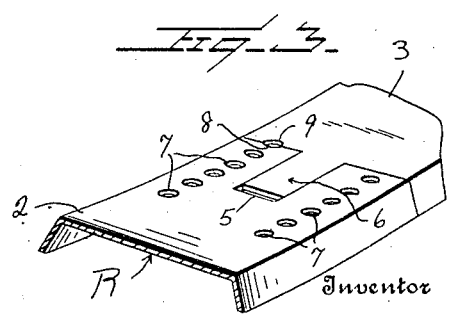
Inventor
W. S. Krause
By Watson E. Coleman
Attorney

UNITED STATES PATENT OFFICE.

WILLIAM SAMUEL KRAUSE, OF NORTH LA JUNTA, COLORADO.

DEMOUNTABLE RIM.

1,342,118.    Specification of Letters Patent.    Patented June 1, 1920.

Application filed January 3, 1920. Serial No. 349,212.

*To all whom it may concern:*

Be it known that I, WILLIAM SAMUEL KRAUSE, a citizen of the United States, residing at North La Junta, in the county of Otero and State of Colorado, have invented certain new and useful Improvements in Demountable Rims, of which the following is a specification, reference being had to the accompanying drawings.

This invention relates to certain improvements in demountable rims, and it is an object of the invention to provide a novel and improved device of this general character whereby a ready and convenient application or removal of a tire may be effected.

Another object of the invention is to provide a novel and improved device of this general character comprising a plurality of hingedly connected arcuate sections, a pair of said sections being free of positive connection, together with means whereby the extremities of said sections may be caused to abut to properly maintain the rim and a tire in assembled relation and which means also provides for a convenient and effective collapse of the rim.

The invention consists in the details of construction and in the combination and arrangement of the several parts of my improved rim whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation with portions broken away of a rim constructed in accordance with an embodiment of my invention and with a tire applied thereto.

Fig. 2 is a view in perspective of the separated end portions of two adjacent sections; and Fig. 3 is a fragmentary view in perspective showing the end portions illustrated in Fig. 2 in assembled or working relation.

As disclosed in the accompanying drawings, R denotes a rim constructed in accordance with an embodiment of my invention and which includes three sections 1, 2, and 3. The section 1 is preferably substantially semi-circular in form and the sections 2 and 3 each substantially one-quarter circle. The sections 2 and 3 each have one end portion hingedly connected as at 4 with an end portion of a section 1 and whereby the sections 2 and 3 may be readily folded or collapsed inwardly of the section 1 or in a direction toward said section 1.

The outer or free extremity of the section 2 has pressed or otherwise formed in its inner face a longitudinally disposed open recess or pocket 5, positioned substantially at the transverse center of said section 2, while the coacting extremity of the section 3 is provided with a tongue 6 which is adapted to be substantially snugly received within the recess or pocket 5 when the rim R is in operative engagement with the tire T.

The section 2 at opposite sides of the pocket or recess 5 is provided with the longitudinally disposed series of openings 7, the openings 7 of one series being staggered with the respect to the openings 7 of the second series. The end margin of the second section 2 at one side of the pocket or recess 5 is provided with the recess or notch 8 which is adapted to register with a notch or recess 9 formed in the coacting end edge of the section 3.

In applying the tire T to the rim R, the sections 2 and 3 are initially in a folded or collapsed position and tire T properly engaged with the section 1. The sections 2 and 3 are then swung outwardly to properly engage the tire T and in order to properly spring said sections 2 and 3 so that the free edges thereof will abut, a punch or other implement is inserted through an opening 7 whereby a leverage action is afforded to properly spread the sections 2 and 3. This operation is continued in connection with the remainder of the openings 7 until the free ends of the sections 2 and 3 are caused to abut and at which time the tongue 6 seats within the pocket or recess 5. In practice, it is preferred that two punches or implements be employed, one in connection with each of the series of openings 7.

When it is desired to demount the tire, it is only necessary to engage a punch within the opening afforded by the registering notches or recesses 8 and 9 to spring the sections 2 and 3 out of abutting contact. When this is accomplished the sections 2 and 3 are readily folded or collapsed within the section 1 and the rim R can be readily removed.

From the foregoing description, it is thought to be obvious that a rim constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A tire rim comprising a plurality of hingedly connected sections, two of the sections having free ends adapted to abut when the rim is in working position, the free end portion of one of said sections being provided with a plurality of longitudinally spaced openings, said openings being arranged in series, a series of said openings being positioned at each side of the transverse center of the section.

2. A tire rim comprising a plurality of hingedly connected sections, two of the sections having free ends adapted to abut when the rim is in working position, the free end portion of one of said sections being provided with a plurality of longitudinally spaced openings, said openings being arranged in series, a series of said openings being positioned at each side of the transverse center of the section, the openings of one series being staggered with the respect to the openings of the second series.

In testimony whereof I hereunto affix my signature.

WILLIAM SAMUEL KRAUSE.